United States Patent

[11] 3,590,295

| [72] | Inventors | Anthony Derek Appleton;<br>Robert B. MacNab; Joseph Merelie Elliott,<br>all of Newcastle-upon-Tyne, England |
|---|---|---|
| [21] | Appl. No. | 873,398 |
| [22] | Filed | Nov. 3, 1969 |
| [45] | Patented | June 29, 1971 |
| [73] | Assignee | International Research & Development Company Limited<br>Newcastle-upon-Tyne, England |
| [32] | Priority | Nov. 8, 1968 |
| [33] | | Great Britain |
| [31] | | 53136/68 |

[54] HOMOPOLAR ELECTRICAL MACHINES
5 Claims, 5 Drawing Figs.

[52] U.S. Cl. .................................................. 310/178
[51] Int. Cl. ............................................... H02k 31/00
[50] Field of Search ........................................... 310/178, 268, 265; 322/48

[56] References Cited
UNITED STATES PATENTS
1,255,838  2/1918  Knoll ........................... 310/178

| 1,327,349 | 1/1920 | Morse | 310/178 |
| 3,229,133 | 1/1966 | Sears | 310/178 |
| 3,497,739 | 2/1970 | Appleton | 310/178 |

FOREIGN PATENTS
637,339  2/1962  Canada ..................... 310/178

Primary Examiner—Milton O. Hirshfield
Assistant Examiner—R. Skudy
Attorney—Kemon, Palmer and Estabrook ABSTRACT: A homopolar electrical machine having a plurality of rotor conductors and having brushes cooperating with the rotor conductors and interconnected by stationary conductors to form two parallel circuits between the terminals of the machine. The two circuits including series-connected rotor conductors from sections of the rotor lying on opposite sides of a diameter of the rotor and the circuits being maintained continuously as the rotor conductors engage and disengage successive brushes, wherein for the purpose of reducing forces on the stator windings stationary compensating conductors are connected between the machine terminals and the brushes. In the case of a disc rotor with radial rotor conductors the compensating conductors can be two in number and follow arcuate paths of equal radius coaxial with and in a plane parallel to the rotor.

HOMOPOLAR ELECTRICAL MACHINES

The present invention relates to a homopolar electrical machine having a stator winding, a rotor with a plurality of rotor conductors arranged in a ring around the rotor axis and having first and second contact segments at opposite ends of the rotor conductors which are engaged by first and second sets of brushes interconnected by stationary conductors to produce a continuous current path between the terminals of the machine which includes series-connected rotor conductors.

Such a machine is described in German Pat. specification No. 290,592 and in our British Pat. application No. 371/67 and the corresponding Italian Pat. No. 829,625 and Swiss Pat. No. 470,795. The connection of the rotor conductors in series serves to multiply the voltage. Preferably the spacing of the brushes is twice that of the associated contact segments so that the series connection is effected alternately between a set of first rotor conductors and a set of second conductors which lie between the first conductors, whilst in intermediate positions each brush bridges a first conductor and a second conductor.

Such machines suffer from the disadvantage that the terminals of the machine are connected to a brush of one set and a brush which is adjacent the corresponding brush of the other set so that in the intermediate positions of the rotor a voltage close to the operating voltage of the machine exists between adjacent contact segments. To overcome this it is proposed in our pending Pat. application No. 796,081 to connect the brushes so that two parallel current paths are formed through series-connected rotor conductors lying in two sections on opposite sides of a diameter of the rotor. The connections to the machine terminals can then be made to two adjacent brushes of one set of two adjacent brushes of the other set which are diametrically opposite the two brushes of the one set.

However in this arrangement problems can arise due to mechanical reaction forces being exerted on the stator field winding of a machine due to currents flowing in the stationary conductors interconnecting the separate sets of stationary brushes in the rotor circuit. It may be particularly desirable where stator field windings are formed of coils of superconducting wire that reaction forces on the coils due to the above cause be minimized since the forces are high and such coils can be fragile.

In accordance with the present invention there is provided a homopolar electrical machine having a stator winding, a rotor with a plurality of rotor conductors arranged in a ring around the rotor axis and having first and second contact segments at opposite ends of the rotor conductors which are engaged by first and second sets of brushes interconnected by stationary conductors to produce two parallel continuous current paths between the terminals of the machine, each path including series-connected rotor conductors from one of two sections of the rotor lying on opposite sides of a diameter of the rotor, characterized in that the series-connected rotor conductors of each section are connected to a terminal of the machine through a stationary compensating conductor so positioned that the current flowing in it produces forces on the stator winding which counteract forces exerted on the winding by current flowing in the stationary conductors.

For example in a machine having a disc rotor with radially extending rotor conductors disposed around the disc the stationary conductors interconnecting the brushes may lie in a plane parallel to the plane of the disc with each stationary conductor at an acute angle to a line extending radially from the rotor axis. The current flowing in each stationary brush-interconnecting conductor may be considered to be composed of two mutually perpendicular components, a first radial component and a second, smaller, circumferential component. The total effect of all the radial components of currents in producing a magnetic field causing forces to be exerted on the stator field winding is zero, but the resultant of the circumferential components of current in the stationary brush-interconnecting conductors of each section is a single current flowing in an arcuate path over the portion of the plane in which the stationary conducting paths of that section are disposed and this current can give rise to an appreciable force being exerted on the stator field winding.

The arcuate paths of the two sections are generally coaxial with the rotor axis and equal in radius and it is possible to calculate the required radius for two compensating conductors disposed along matching arcuate paths.

By disposing compensating conductors between the terminals and brushes of a machine in the manner described the resultant force on the stator field winding due to currents flowing in stationary conductors of the rotor circuit can be substantially reduced or entirely eliminated. In practice, due to manufacturing tolerances in producing a support disc for a disc rotor machine, for example, there will usually be a small residual sideways force exerted on the stator field winding.

In disc rotor machines having two sets of rotor conductors forming two disc assemblies mounted back to back the residual sideways forces due to the two assemblies can be made to substantially cancel each other by arranging the connections to the two assemblies so that the sideways forces oppose each other. For this purpose the compensating conductors of the two assemblies are connected to the machine terminals at diametrically opposite positions. It is also desirable that the connections from the brushes to the terminals which are not made by the compensating conductors should be at the same position for each assembly as the connections of the compensating conductors to the terminals.

The invention will now be described in more detail with the aid of examples illustrated in the accompanying drawings, in which.

Figure 1:
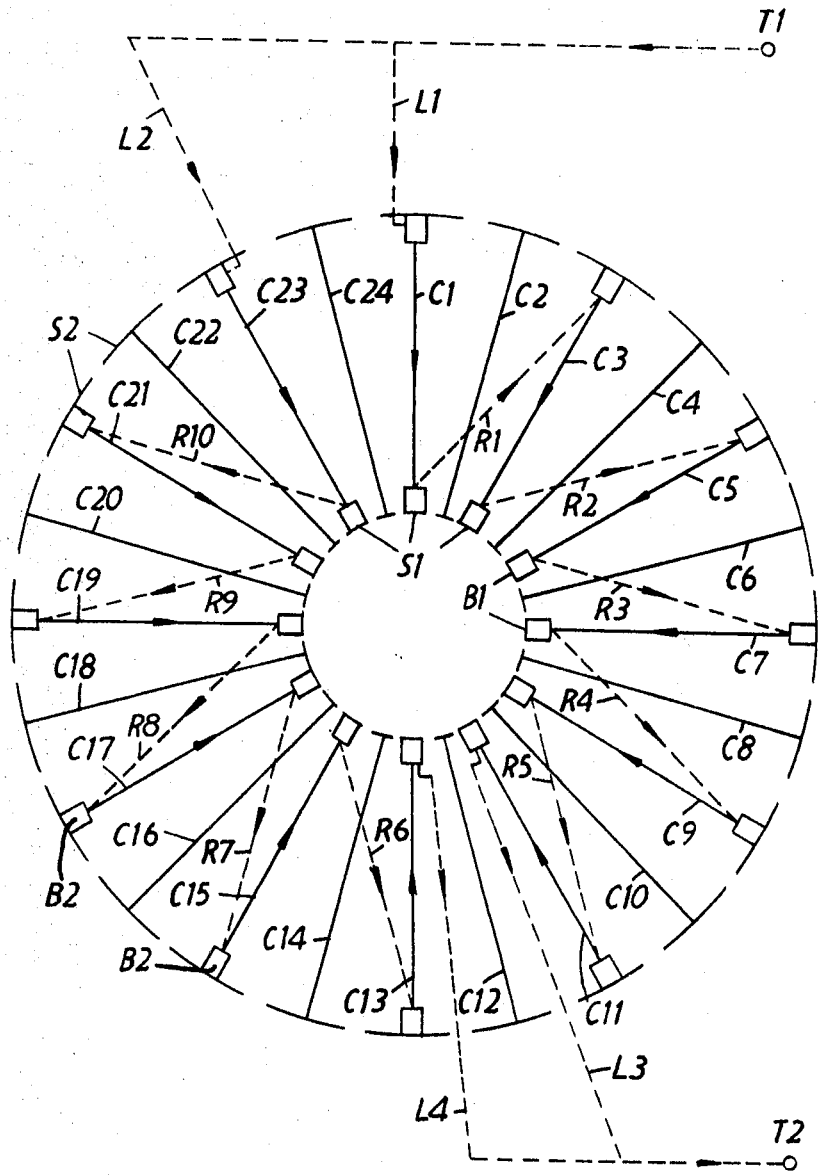
FIG. 1 shows an arrangement of conducting paths on a disc rotor of a homopolar machine in accordance with our aforesaid copending Pat. application No. 796,081.

Referring first to FIG. 1, a rotor circuit arrangement for a disc-type homopolar machine is shown. Mounted on or constituting the disc are a plurality of radially disposed rotor conductors $C_1$ - $C_{24}$, the inner ends of which are connected to an inner ring of contact segments $S_1$ whilst the outer ends are connected to an outer ring of contact segments $S_2$. The individual segments of each ring are insulated from one another by electrical insulation (not shown) so that the segments are intervening insulation of each ring form a complete segmental ring.

Sliding on each segmental ring as the rotor rotates is a set of brushes. Brushes $B_1$ form an inner set engaging segments $S_1$ whilst brushes $B_2$ form an outer set engaging segments $S_2$.

The brushes of the two sets are interconnected by stationary conductors $R_1$—$R_{10}$, shown as dashed lines, as also are the connections $L_1$—$L_4$ conveying current between the rotor circuit and an external circuit by way of the machine terminals $T_1$, $T_2$.

Conductors $R_1$—$R_{10}$ and connections $L_1$—$L_4$ are arranged so that the rotor conductors $C_1$—$C_{24}$ are divided into two sections lying on opposite sides of a diameter of the rotor with an equal number of rotor conductors in each section. Each section comprises a series arrangement of rotor conductors and is connected in parallel with a similar series arrangement of the rotor conductors in the other section between the terminals $T_1$ and $T_2$. One of the series arrangements thus follows the conduction path formed by the sequence of elements $T_1$, $L_1$, $C_1$, $R_1$, $C_3$, $R_2$, $C_5$, $R_3$, $C_7$, $R_4$, $C_9$, $R_5$, $C_{11}$, $L_3$, $T_2$, whilst the parallel conduction path is formed by the sequence of elements $T_1$, $L_2$, $C_{23}$, $R_{10}$, $C_{21}$, $R_9$, $C_{19}$, $R_8$, $C_{17}$, $R_7$, $C_{15}$, $R_6$, $C_{13}$, $C_4$, $T_2$. As the rotor rotates the conductors $C_1$, $C_3$, $C_5$, $C_7$, $C_9$ and $C_{11}$ and conductors $C_2$, $C_4$, $C_6$, $C_8$, $C_{10}$, and $C_{11}$ are connected in series alternately. When not connected in series the conductors are disconnected from the terminals. The conductors $C_{23}$, $C_{21}$, $C_{19}$, $C_{17}$, $C_{15}$, $C_{13}$ and the conductors $C_{24}$, $C_{22}$, $C_{20}$, $C_{18}$, $C_{16}$ and $C_{14}$ are connected and disconnected in a similar manner. The changeover is, however, arranged so that current flow in each section is continuous.

The rotor is preferably surrounded by a toroidal stator winding which is both coplanar and coaxial with the rotor disc. The stator winding provides a magnetic field which is generally perpendicular to the rotor disc and which cuts the rotor conducting paths $C_1$—$C_{24}$ when the rotor rotates. Thus, when the machine is operated as a motor, current is passed to the rotor via terminals $T_1$ and $T_2$ and the circumferential force exerted on them by the stator field causes rotation of the rotor disc.

The stationary conductors $R_1$—$R_{10}$ are disposed in a plane adjacent to and parallel to the plane of the rotor conductors in such a way that the reaction torque on the rotor is met by the stationary conductors $R_1$—$R_{10}$ and not by the stator field winding.

Since the stationary conductors $R_1$—$R_{10}$ do not lie radially with respect to the rotor axis, each being at an acute angle to a radial line, the currents in these conductors can be resolved into circumferential and radial components. The effect of the radial components of the current in causing circumferential forces on the stator field winding is cancelled by the effect of the rotor conductor currents, which are also radial, but the circumferential components of current give rise to radial forces on the stator winding.

Figure 2:
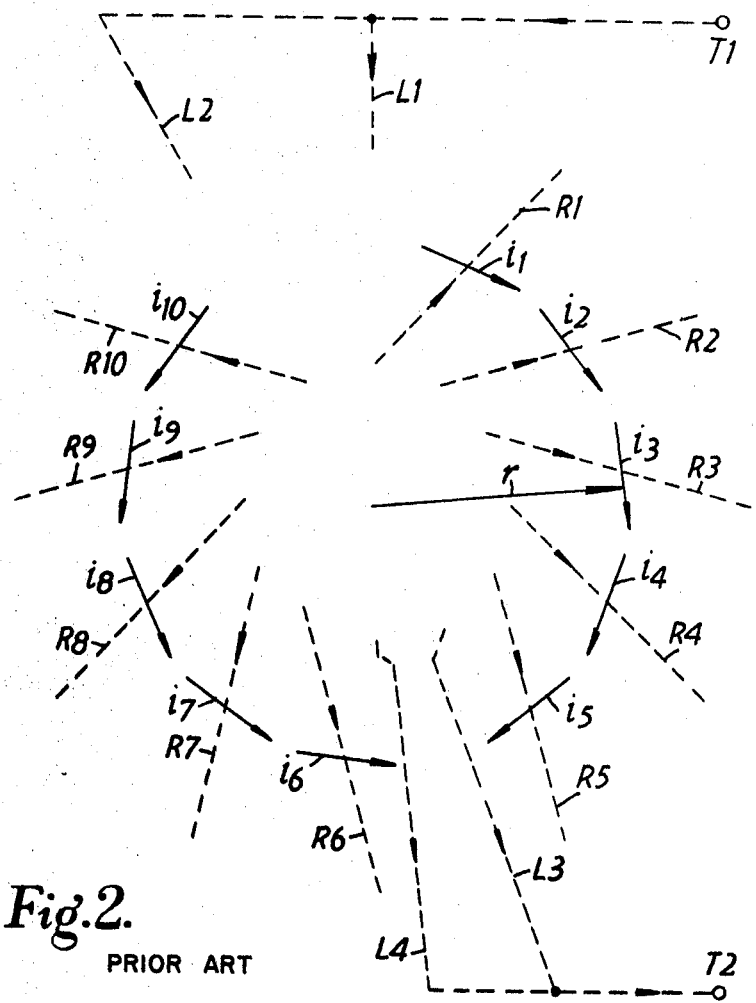
FIG. 2 is a diagram showing the disposition of certain components of currents flowing in current paths shown in FIG. 1.
Figure 3:
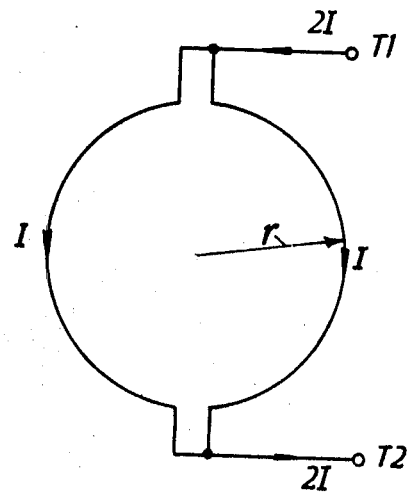
FIG. 3 is a diagram showing resultant current paths equivalent to the components of currents shown in FIG. 2.

The circumferential components of current in conductors $R_1$—$R_{10}$ are indicated in FIG. 2 where they are given the references $i_1$, $i_2$........$i_{10}$. They may be considered to act along two arcuate current flow paths of radius $r$, there being one path for each rotor section. These arcuate current flow paths are shown in FIG. 3.

The radius $r$ of each arcuate path must be such that the force $f$ on it due to the stator magnetic field is equal to the resultant force F on the stationary conductors of the corresponding section. The force $f$ on each arcuate path can be calculated from the formula:

$$f = BIr \sin\theta \, d\theta = 2 BIr$$

where $B$ = flux density of stator field at radius $r$
$I$ = current flowing in each arcuate path
(i.e. half the rotor current)
$r$ = radius of the arcuate path
$\theta$ = angle of integration.

Since $F=f$, for the correct equivalent arcuate path, and B is related to $r$, the value of $r$ may thus be determined.

In accordance with the invention, the effect of the current flowing in the two arcuate paths described is minimized by supplying the current to the rotor circuit by way of compensating conductors of which there can be two forming a ring of radius $r$ disposed adjacent to the stationary conducting paths and in which current flows in the opposite direction to the flow of current in the arcuate paths.

Figure 4:
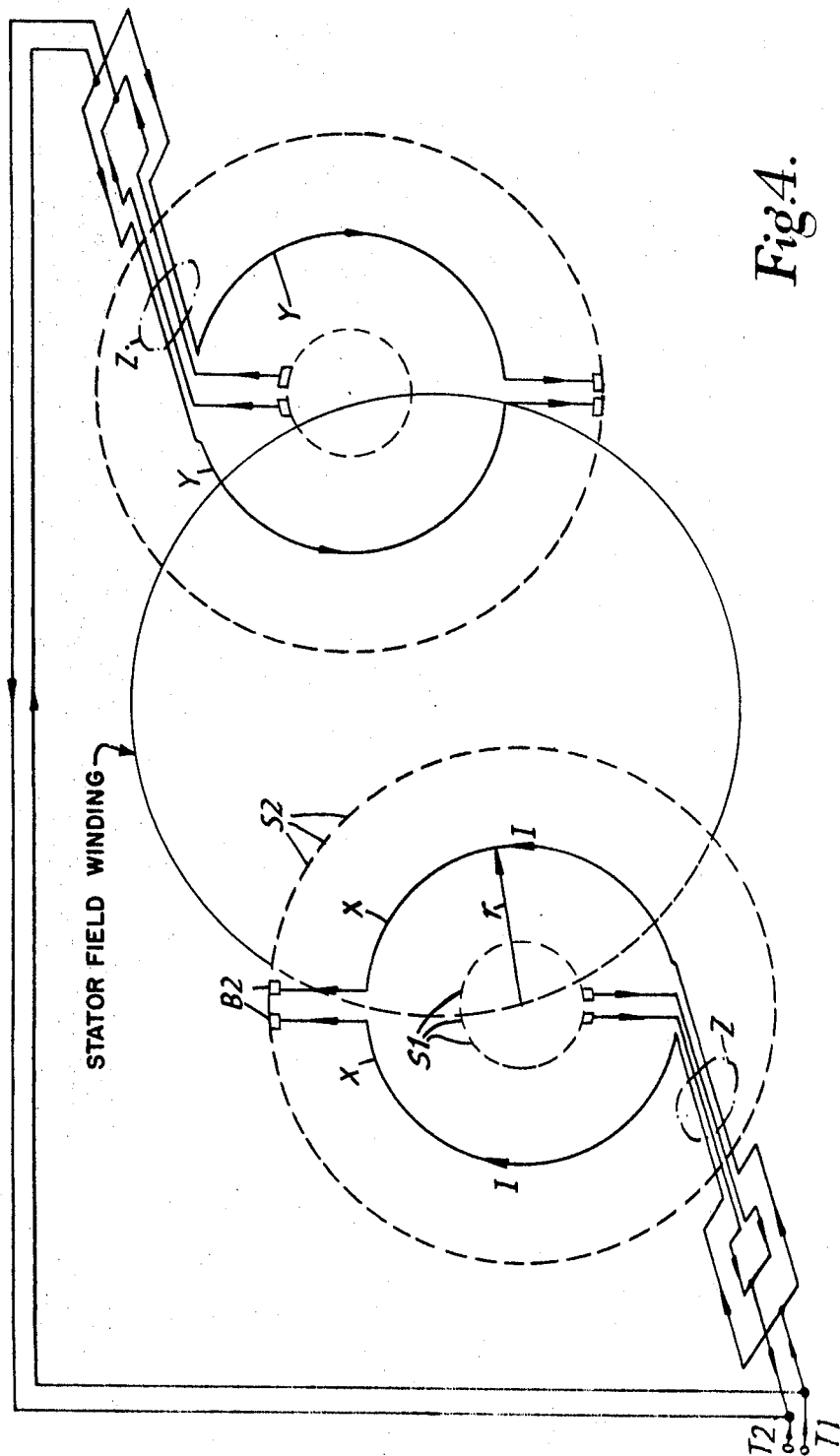
FIG. 4 is a diagram showing the disposition of conductors between machine terminals and the rotor circuit of a homopolar machine in accordance with the present invention.

Referring to FIG. 4, this shows the compensating conductors between the machine terminals and brush-sets for a machine having two sets of rotor conductors, each set being disposed in a disc-shaped assembly and the two assemblies being mounted back-to-back on a support disc. The rotor disc and windings have been omitted for the sake of clarity.

The left-hand side of FIG. 4 corresponds to the connections suitable for the rotor winding described with reference to FIGS. 1—3, the segments $S_1$ and $S_2$ of the segmental contact rings being in the positions indicated.

Current is led into the left-hand rotor circuit by way of terminal $T_1$, compensating conductors X and brushes $B_2$. The compensating conductors X lie along a semicircular path of radius $r$, each carrying current I in an upward direction, and these currents thus minimize the effects of the currents I flowing downwards shown in FIG. 3.

In practice, the counterflowing currents do not fully cancel the forces experienced on the stator field winding, partly due to manufacturing tolerances and the like permitted in producing, for example, the rotor support disc. The residual force can be further reduced in a double rotor winding of the type shown in FIG. 4, however, by inverting the position of the supply and return conductors to the brushes and compensating conductors X of the second rotor winding relative to the first rotor winding. The currents thus flow downwardly in conductors Y shown at the right-hand side of FIG. 4, and the residual sideways force on the stator winding due to the right-hand rotor circuit acts to oppose the residual force due to the left-hand rotor circuit.

It will be seen from FIG. 4, that the supply and return conductors for the rotor circuits enter the region of the stationary brush-interconnecting conductors of each rotor circuit at adjacent positions, as indicated by the chain-dotted loops Z, in the arrangement according to the present invention. This allows the conductors to be disposed side by side or coaxially in these regions, which minimizes the effect of the stator field flux gradient along the conductors and consequently again minimizes any forces exerted on the stator field winding.

The arrangement is particularly suitable for homopolar machines having superconducting windings where the forces acting on the superconducting stator coil due to currents in the stationary brush-interconnecting conductors can be high.

Figure 5:
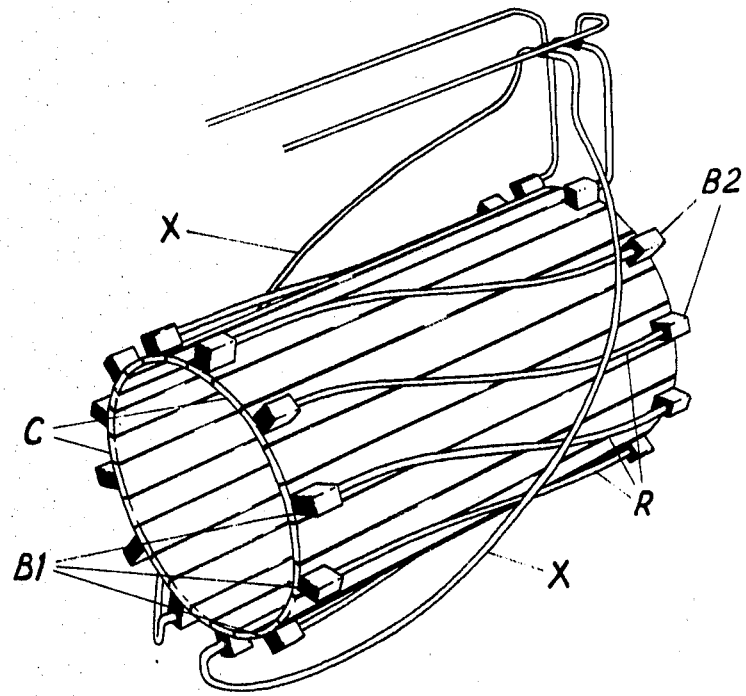
FIG. 5 shows the application of the invention to a drum-type rotor with axially directed conductors.

Whilst the invention has been described in its application to a disc-type homopolar machine, it may also be applied to a drum-type homopolar machine. In the drum-type machine with axially extending conductors and rings of contact segments at each end of the drum the path of the resultant current equivalent to I in FIG. 3 will tend to follow a helical path along the drum surface from one end of the drum to the other. The compensating conductors equivalent to those shown in FIG. 4 will therefore also follow a helical path spaced from the rotor and carrying current in the opposite direction. FIG. 5 shows a typical drum rotor with axial rotor conductors C, brush sets $B_1$ and $B_2$, stationary conductors R and compensating conductors X.

Whilst in the embodiment shown in single compensating conductor is shown for each paralleled section this is not essential and two or more compensating conductors can replace each single conductor to produce the same net compensating force.

In the disc rotor machine as shown in FIG. 1 the stator field winding would be of toroidal form around the periphery of the disc and the lines of force of the magnetic field would cut the plane of the disc i.e. they would be essentially perpendicular to the plane of the paper. In the case of the drum rotor, two field coils can be used one at each end of and surrounding the rotor.

We claim:

1. In a homopolar electrical machine comprising a stator winding for generating a magnetic field, a rotor having mutually insulated rotor conductors which are cut by the magnetic field as the rotor rotates, first and second rings of mutually insulated contact segments located at opposite ends of the rotor conductors each rotor conductor being connected to a segment of one ring and a corresponding segment of the other ring, two sets of brushes, one set cooperating with each ring of contact segments, rotor current terminals, stationary conductors connecting the brushes whereby two parallel current paths are set up through series-connected rotor conductors lying in sections of the rotor disposed on opposite sides of a diameter of the rotor the series connection being effected alternately as the rotor rotates between a first set of rotor conductors and a second set of rotor conductors lying between conductors of the first set in the direction of rotation, the improvement which comprises at least one compensating conductor positioned in relation to the magnetic field cutting the rotor to produce forces on the stator winding as a result of current flow in the said compensating conductor and its interaction with the field which substantially counterbalance the forces exerted on the said winding as a result of currents flowing in the said stationary conductors.

2. A machine as claimed in claim 1 wherein the rotor is of the disc-type with radially disposed rotor conductors and stationary conductors extending in a generally radial direction but at an angle to the rotor conductors characterized in that the compensating conductor follows an arcuate path over the surface of the disc in a plane parallel to the plane of the disc but spaced therefrom.

3. A machine as claimed in claim 2 characterized in that there are two compensating conductors disposed along matching arcuate paths on opposite sides of a diameter of the rotor at substantially the same radius.

4. A machine as claimed in claim 3 having two disc-type rotors mounted back-to-back characterized in that the compensating conductors associated with one disc are connected to a machine terminal at a position diametrically opposite to the connections of the compensating conductors of the other disc to a machine terminal.

5. A machine as claimed in claim 1 in which the rotor is of the drum-type with axially disposed rotor conductors and stationary conductors extending in a generally axial direction but following paths at an angle to the rotor conductors in which the machine or each compensating conductor follows a helical path over the rotor surface but in spaced relation thereto.